Oct. 28, 1969  D. N. McCARTNEY ET AL  3,474,925
CARGO HANDLING APPARATUS
Filed Dec. 4, 1967  11 Sheets-Sheet 3

INVENTORS
Duane N. McCartney
Arnold Duerksen
BY Flehr, Hohbach, Test,
Albritton & Herbert
Attorneys

Oct. 28, 1969  D. N. McCARTNEY ET AL  3,474,925
CARGO HANDLING APPARATUS

Filed Dec. 4, 1967  11 Sheets-Sheet 4

INVENTORS
Duane N. McCartney
Arnold Duerksen
BY Flehr, Hohbach, Test,
Albritton & Herbert
Attorneys Oct. 28, 1969  D. N. McCARTNEY ET AL  3,474,925
CARGO HANDLING APPARATUS
Filed Dec. 4, 1967  11 Sheets-Sheet 6

Fig. 9

INVENTORS
Duane N. McCartney
Arnold Duerksen
BY Flehr, Hohbach, Test,
Albritton & Herbert
Attorneys

Fig. 10

INVENTORS
Duane N. McCartney
Arnold Duerksen
BY Flehr, Hohbach, Test,
Albritton & Herbert
Attorneys Oct. 28, 1969  D. N. McCARTNEY ET AL  3,474,925
CARGO HANDLING APPARATUS
Filed Dec. 4, 1967  11 Sheets-Sheet 8

INVENTORS
Duane N. McCartney
Arnold Duerksen
BY
Attorneys

Oct. 28, 1969  D. N. McCARTNEY ET AL  3,474,925
CARGO HANDLING APPARATUS
Filed Dec. 4, 1967  11 Sheets-Sheet 10

INVENTORS
Duane N. McCartney
Arnold Duerksen

Flehr, Hohbach, Best,
Albritton & Herbert
Attorneys

INVENTORS
Duane N. McCartney
Arnold Duerksen
Attorneys

United States Patent Office 3,474,925
Patented Oct. 28, 1969

3,474,925
CARGO HANDLING APPARATUS
Duane N. McCartney, Pebble Beach, and Arnold Duerksen, Salinas, Calif., assignors, by mesne and direct assignments, to Cochran Western Corporation, Salinas, Calif., a corporation of California
Continuation-in-part of application Ser. No. 612,382, Jan. 30, 1967. This application Dec. 4, 1967, Ser. No. 687,712
Int. Cl. B60p 1/02
U.S. Cl. 214—512   12 Claims

ABSTRACT OF THE DISCLOSURE

Cargo handling apparatus making use of screw hoists wherein the screws operate in tension rather than compression, such operations being particularly adapted to use in fixed or mobile units for use in the loading and unloading of various types of cargo carriers. Cargo platform is adjustable in angle and can be warped to different angles at loading and unloading ends. Cargo platform is also provided with conveying apparatus to move cargo onto or off the apparatus in loading and unloading operations.

CROSS-REFERENCE TO RELATED APPLICATION

This application is a continuation-in-part of copending application Ser. No. 612,382, filed Jan. 30, 1967, now abandoned, by applicant, Duane N. McCartney, and titled Cargo Handling Apparatus.

BACKGROUND OF THE INVENTION

This invention relates generally to cargo handling apparatus and more specifically to improved apparatus of such type as particularly used in the loading and unloading of aircraft, trucks, ships, and like cargo carriers.

The rapid increase in the size and cargo-carrying capacity of aircraft, both military and commercial, has made it essential that more efficient loading means be devised to reduce the time and effort required in loading and unloading such aircraft. Of particular interest is the development of loading means capable of handling relatively heavy or bulky cargo, yet of sufficiently small size and scale to permit ready installation and use in conjunction with conventional airport facilities. It is also desirable to provide apparatus which will effectively handle cargo loaded on pallets or in containers, thereby making the most efficient use of aircraft, without however prohibiting the use of hand labor in the loading or unloading of such pallets and containers at substantially ground levels.

It has generally been thought that systems of apparatus capable of handling relatively large or heavy units of cargo, such as preloaded baggage containers, pallets, etc., require the use of relatively large or complicated hoist mechanisms. For example, conventional hydraulic and pneumatic or screw hoist systems require proportionately large hoist mechanisms as the loads increase in weight or bulk. On the other hand, cable systems of the type customarily employed with heavy or bulky loads necessarily require cumbersome, space consuming overhead supports and guides for the cables. Cable systems of the type described are consequently not easily adapted to variable use requirements, such as are normally encountered in airports, warehouses, and the like. The present invention, therefore, concerns improved relatively compact cargo handling apparatus, adapted to use in the handling of containers, pallets and other relatively heavy, bulky cargo, which makes efficient use of relatively simple support structures and hoist mechanisms.

SUMMARY OF THE INVENTION AND OBJECTS

This invention is predicated on the discovery that relatively heavy cargo of the type described can be most efficiently handled by apparatus making use of screw hoists, wherein the screws are in tension rather than compression. The concept of screws in tension is achieved by use of structural columns which surround and support rotary screw hoists so that the screw hoists and cargo platform are suspended from the supporting columns. Such concept permits a relatively simple support structure in the form of upstanding columns or supports for the screw hoists, mounted on suitable base support means. One embodiment of the invention, the base support, takes the form of a fixed, substantially rectangular frame which mounts a plurality of support columns for the screw hoists, that function to move the cargo elevator from approximately ground levels to desired loading levels. In another embodiment, the base support takes the form of a plurality of separate retractable support columns, each independently mounting a screw hoist, such arrangement permitting the base support to be raised so that the cargo platform can function as a wheeled or mobile unit. In both instances, suspension of the screw hoists within the support columns (so that the screws are in tension) permits a certain degree of tolerance to flexing within the screw hoists themselves, as in cable hoists, without however encountering the many disadvantages normally found with cable hoists. In contrast, the support columns for the screw hoists are not only quite simple in construction but also possess the necessary strength for handling heavy or difficult cargo.

Although many different types of apparatus have heretofore been employed to load and unload cargo from aircraft, apparatus for such purpose has usually been cumbersome and slow in operation, and as previously noted, has not always facilitated the handling of heavy, bulky cargo. Most prior devices have also failed to provide means for adapting the cargo platform to the various attitudes that the aircraft might take during loading and unloading. A further difficulty has been the size or structural requirements of the cargo handling systems, which have prevented the ready use of such apparatus in many applications, as in airports, baggage terminals, portside facilities and like areas.

It is accordingly a general object of the present invention to provide an improved cargo handling apparatus capable of efficiently loading or unloading heavy, bulky items of cargo such as preloaded containers and pallets, between interconnecting carriers such as aircraft, trucks, rail cars, ships, and the like.

Another object of the invention is to provide cargo handling apparatus of such character making use of rotary screw hoists wherein the screws are mounted in tension so as to not be deformed by the loading.

Another object of the invention is to provide a simple, compact but very strong and durable cargo handling apparatus of such character which will effectively handle greater loads for its size than previous devices, without any danger of damage or misalignment during the loading.

Another object of the invention is to provide cargo handling apparatus having means for tilting and/or warping of the cargo platform into loading alignment with the cargo door of the aircraft, truck or other vehicle being loaded or unloaded.

Still another object of the invention is to provide a cargo handling apparatus of the type described wherein the cargo handling platform is provided with independent conveying means for moving cargo on and off the cargo handling apparatus.

A further particular object of the invention is to provide a cargo handling apparatus which will be as low as possible in the down position, that is, not more than a few inches above the ground or platform, so that manual loading and unloading will be facilitated.

A further particular object of the invention is to provide cargo handling apparatus of the type described wherein the cargo carrying platform is mobile so that the apparatus can be employed both as a transporting means and as a cargo handling means.

These and other objects of the invention will be apparent from the following description of exemplary embodiments, and from the drawings.

GENERAL STATEMENT OF THE INVENTION

In general, the cargo handling apparatus of the instant invention operates in conjunction with conventional cargo or baggage handling equipment to receive items of cargo, to raise or lower the cargo to desired loading or unloading levels, and to discharge the items of cargo fed to the machine in a substantially continuous fashion. The machine is particularly capable of receiving cargo on pallets or containers, transferring such cargo onto a loading elevator, and hoisting the loaded cargo to a desired elevation and position of alignment for unloading the cargo, for example, into aircraft. As successive units of cargo are received by the machine, they are automatically elevated and transferred at the unloading height to the aircraft or other transport vehicle being loaded. The machine thus performs all the successive functions necessary to receiving baggage or cargo, elevating and aligning its cargo platform with the transport vehicle, and thereafter discharging the cargo as required in an efficient loading or unloading operation.

In one embodiment of the machine (FIGURES 1 to 12), cargo can be received by the machine at a low working level (e.g., about two inches above the floor) and then elevated into position adjacent the cargo opening of the aircraft or other vehicle into which the cargo is being loaded. The described low level feature facilitates the receiving of preloaded pallets in conventional fashion, or, alternatively, permits airplane workers to manually load cargo on a pallet placed within the machine without the use of special equipment. In the low level embodiment, the cargo elevator and hoist mechanisms can be mounted on a relatively fixed base or frame, or, if desired, the entire machine can be mounted on a mobile base (FIGURE 13) so that it can easily be moved from one location to another. In still another embodiment of the machine (FIGURES 14 to 17), the cargo elevator itself is a mobile carrier or truck which is capable of moving under its own power between desired locations, where it can be adjusted to use in fixed loading or unloading positions.

Figure 17:
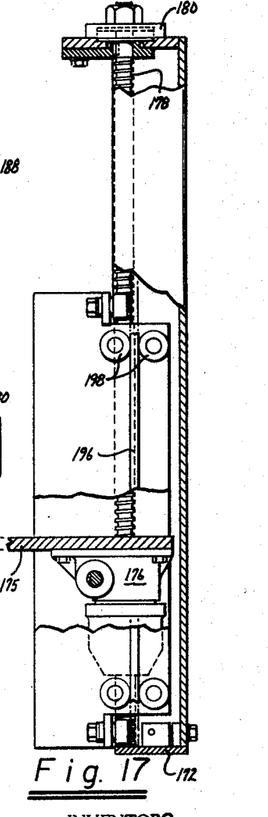
FIGURE 17 is a view partly in vertical section and partly in elevation of the apparatus shown in FIGURE 16.
Figure 18:
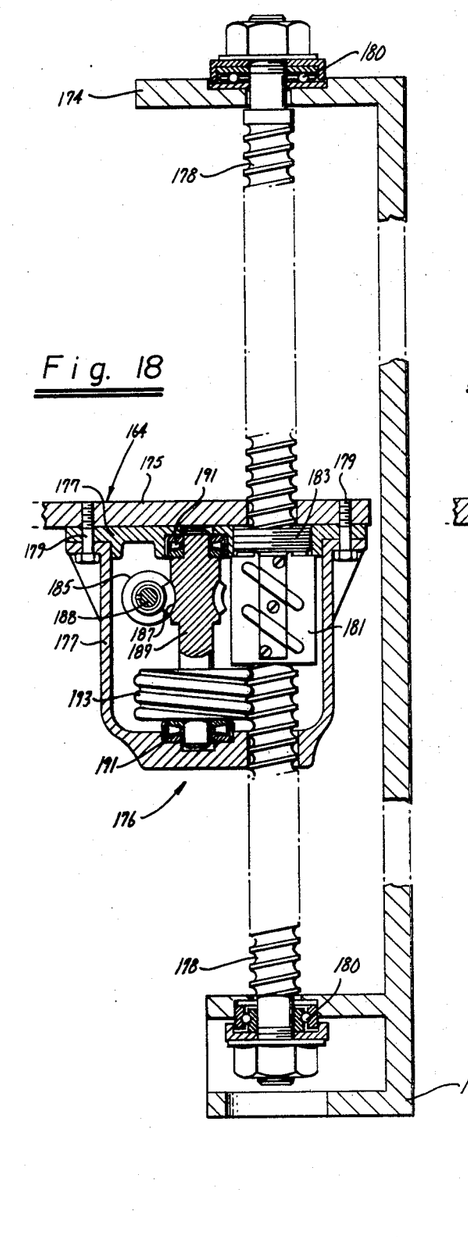
FIGURE 18 is an enlarged sectional view of another embodiment of the screw hoist mechanism of the present invention, illustrated in conjunction with the cargo handling apparatus of FIGURES 14 and 15.
Figure 19:
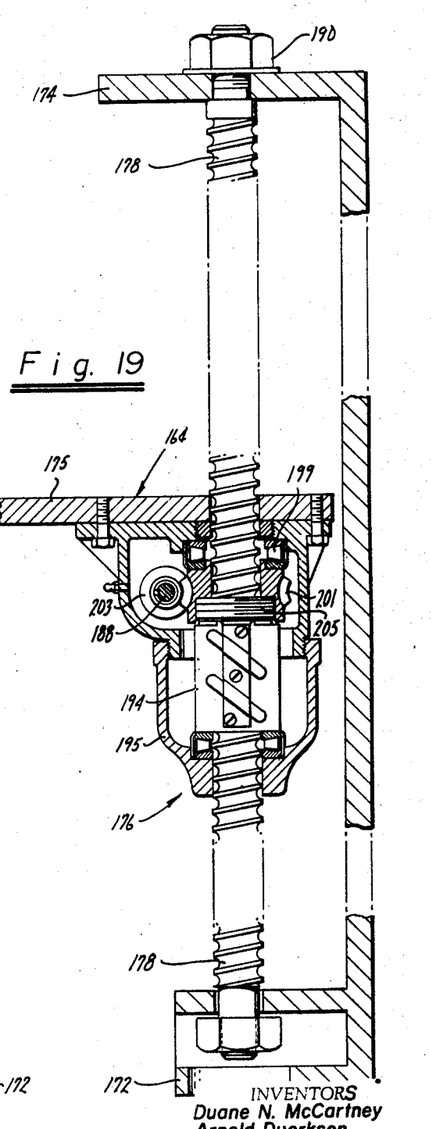
FIGURE 19 is a view like FIGURE 18 of a further embodiment of the screw hoist mechanism of the present invention.

In all embodiments, the hoist mechanisms are in the form of screw hoists wherein the screws are in tension rather than compression. In the embodiments of FIGURES 1 to 17, the hoisting function is achieved by rotation of the screw to impart vertical movement to a follower thrust bearing (FIGURES 10 and 18). In the embodiment of FIGURE 19, the hoisting function is achieved by rotation of the follower thrust bearing, the screws remaining stationary although in tension.

DESCRIPTION OF THE PREFERRED EMBODIMENT

Figure 1:
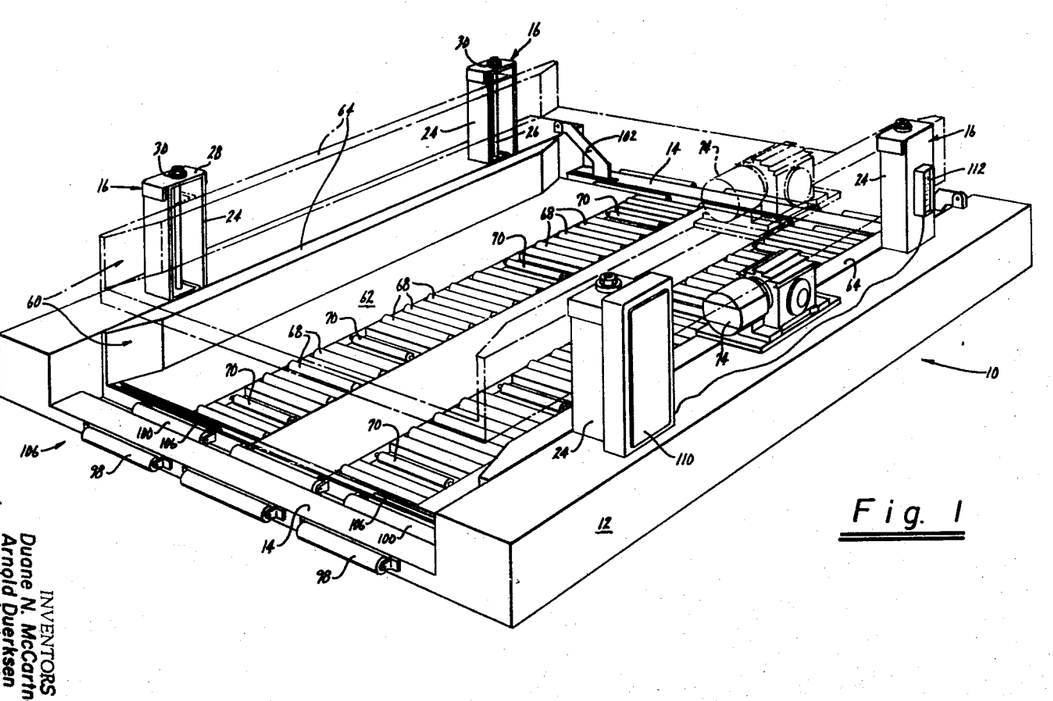
FIGURE 1 is a view in perspective of one embodiment of cargo handling apparatus according to the present invention.
Figure 6:
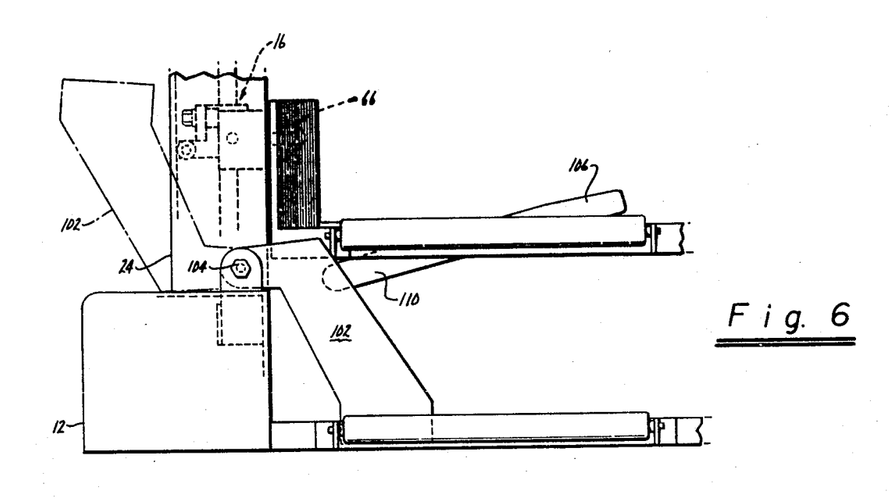
FIGURE 6 is an enlarged detail view in elevation, taken from the far end of the apparatus shown in FIGURE 1, showing an elevated position of the cargo elevator.
Figures 7, 8, 8A:
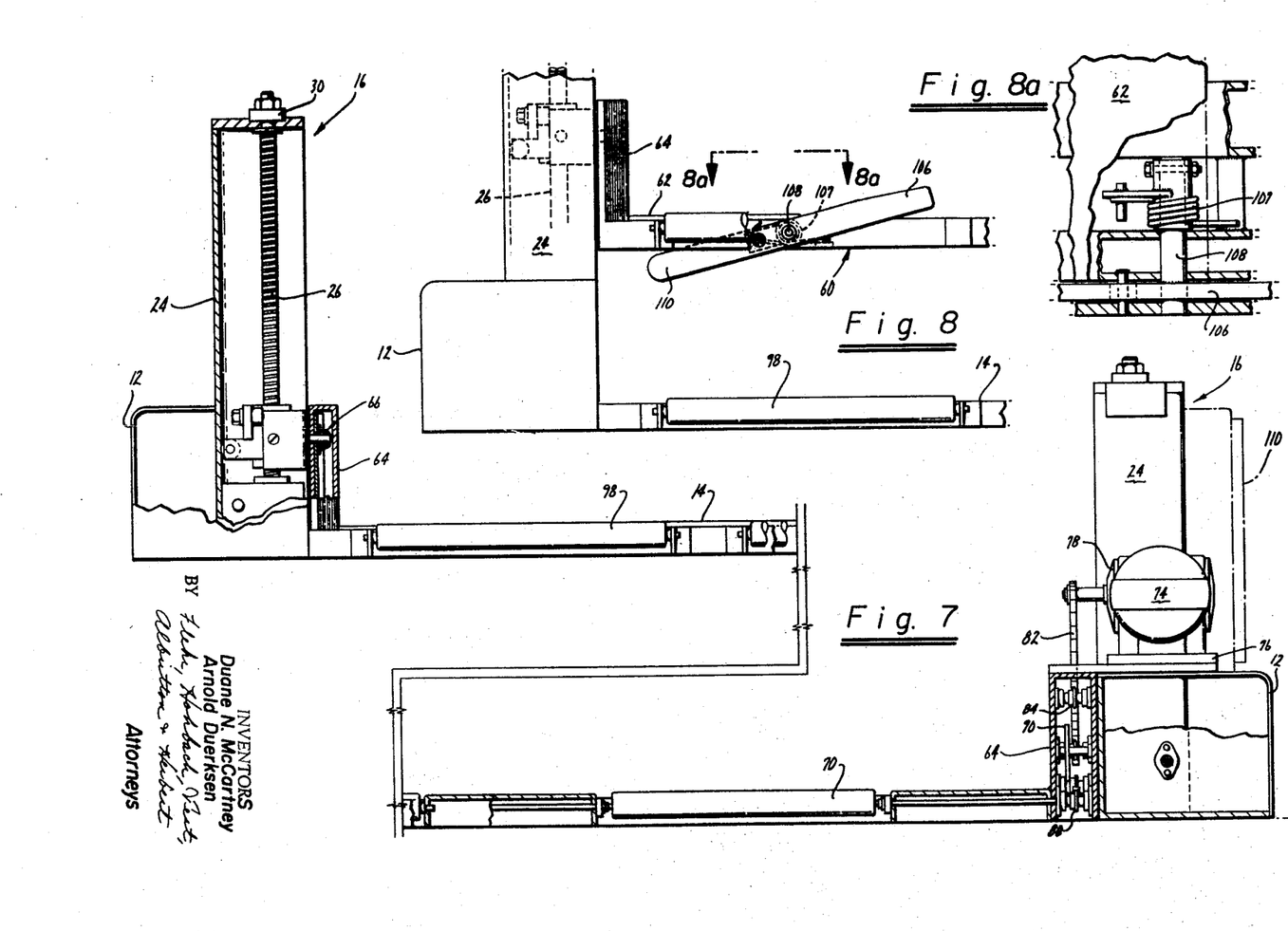
FIGURE 7 is an enlarged view in transverse section taken along the line 7—7 of FIGURE 2.
FIGURE 8 is an enlarged detail view, taken from the near side of FIGURE 1, likewise showing an elevated position of the cargo elevator.
FIGURE 8A is an enlarged detail view, in plan and section, related to FIGURE 8.
Figure 9:
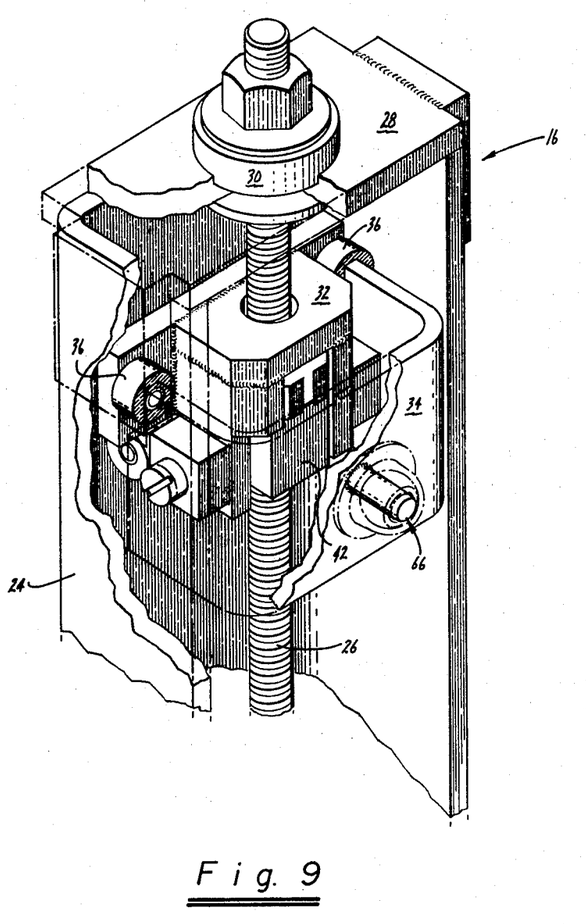
FIGURE 9 is an enlarged perspective view, with parts broken away for clarity, showing features of a screw hoist mechanism in accordance with the invention.
Figure 10:
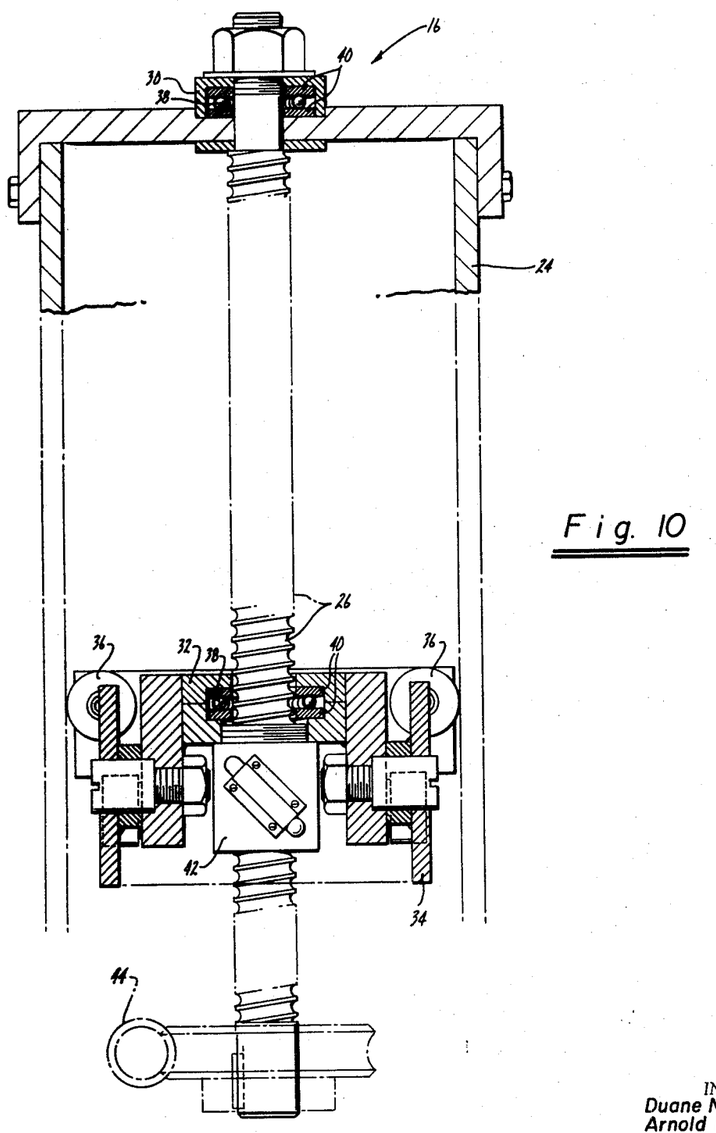
FIGURE 10 is an enlarged sectional view of the apparatus shown in FIGURE 9.
Figure 11:
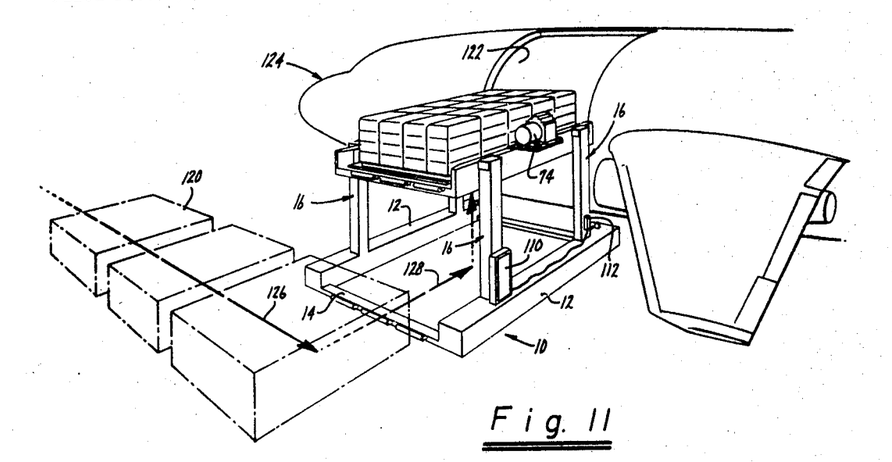
FIGURES 11 and 12 are schematic and elevational views respectively, illustrating the use and operation of another embodiment of cargo handling apparatus according to the invention.

The embodiment of the machine illustrated in FIGURES 1 to 12 comprises a relatively compact base support or frame 10 including hollow box frames or sides 12 suitably connected at their ends with cross frame members 14. The frame provides a support for upstanding hoist mechanisms 16, and for a motor 18 and drive train 20 for operating the hoist mechanisms. As best illustrated in FIGURES 1, 7 and 11, the structure of the base frame or support 10 is such that a cargo elevator 60 may be positioned between the side frames 12, in virtual contact with the ground or loading platform. This construction facilitates loading and unloading operations at very low levels. The compact arrangement of the base frame also provides a substantial frictional engagement with the ground to insure a relatively stationary or fixed support base during loading operations, while permitting the machine to be readily slid or carried from one loading position to another.

THE HOIST MECHANISMS

Figure 2:
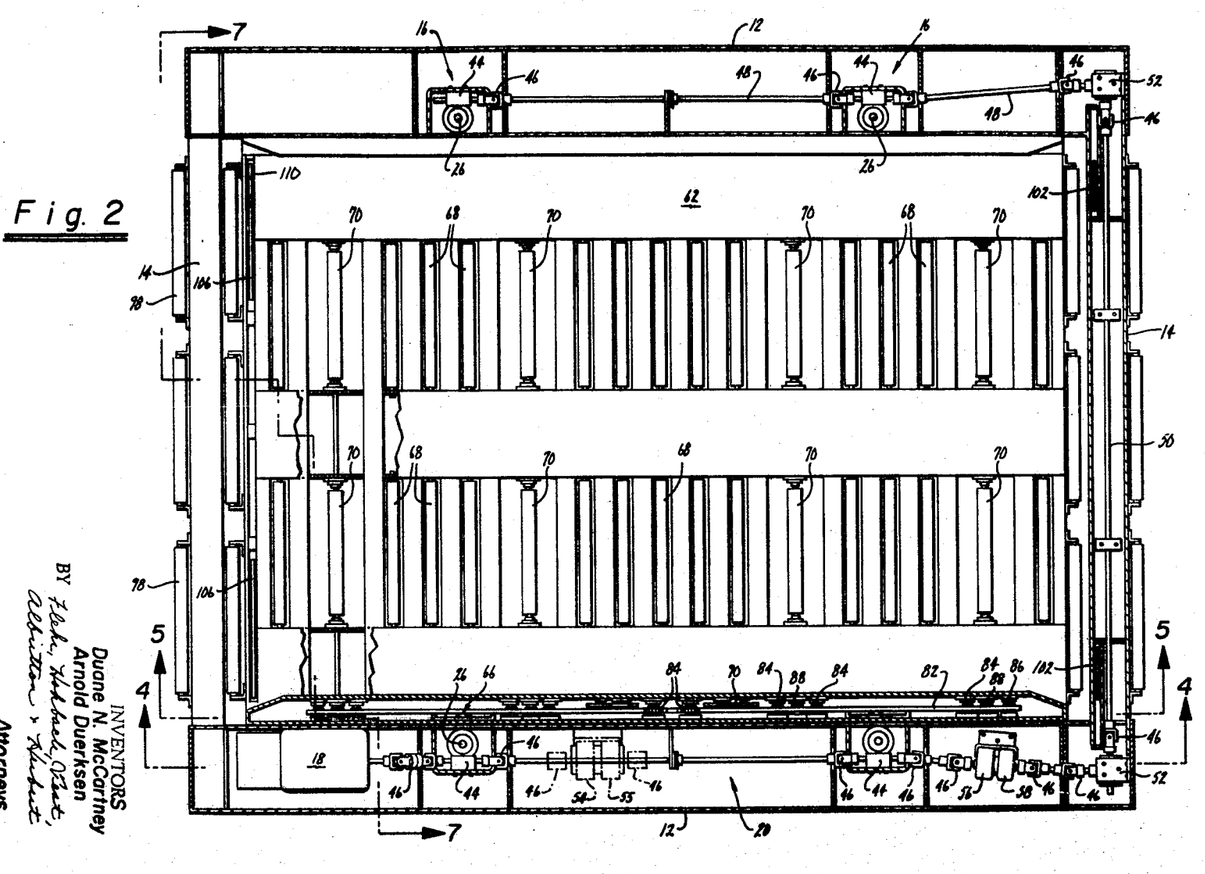
FIGURE 2 is an enlarged view partly in plan and partly in horizontal section of the cargo handling apparatus of FIGURE 1.
Figure 3:
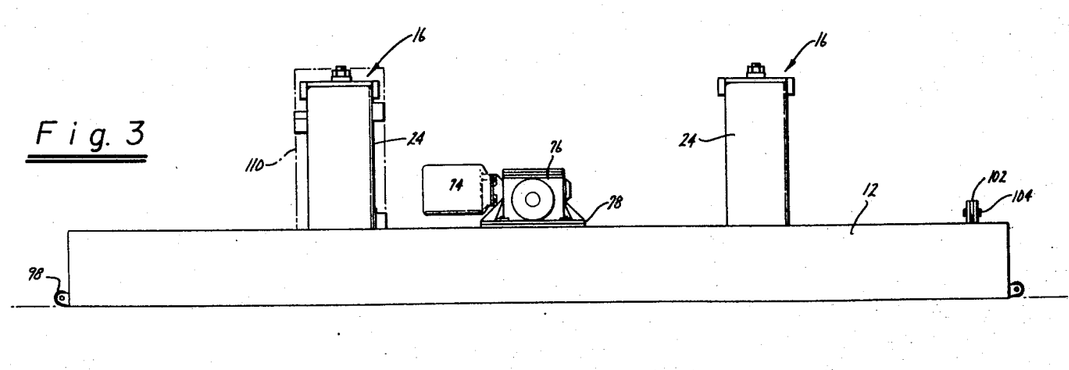
FIGURE 3 is a view in side elevation of the apparatus of FIGURE 1.
Figure 4:
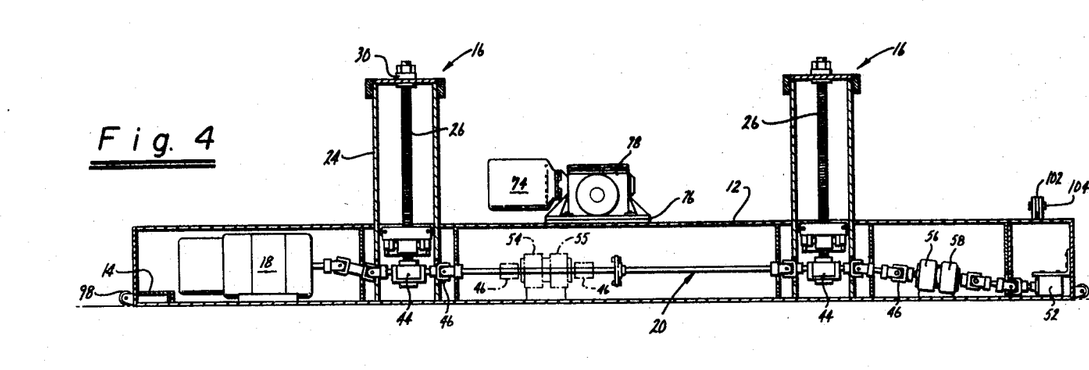
FIGURE 4 is a view in vertical section along the line 4—4 of FIGURE 2.
Figure 5:
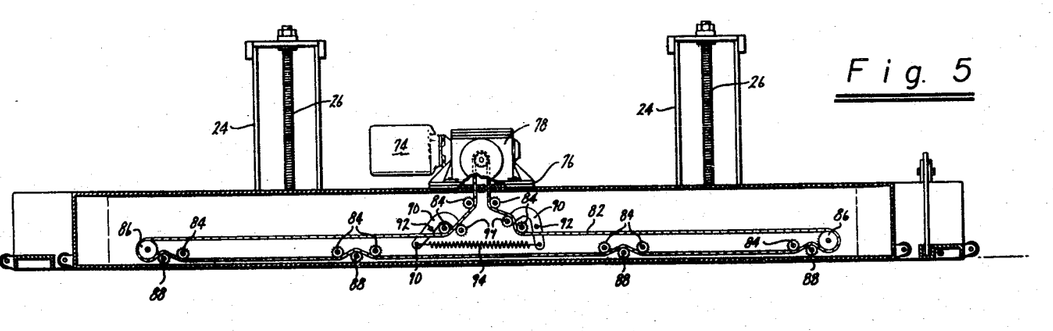
FIGURE 5 is a like view along the line 5—5 of FIGURE 2.
Figure 12:
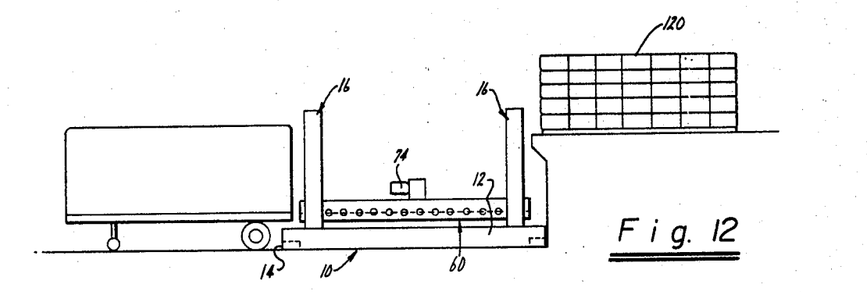

The hoist mechanisms 16 are mounted upon the base support 10 as integral parts thereof (see FIGURES 1, 2 and 4). In the machine illustrated, the hoist mechanisms include a series of upstanding columns or supports 24 which are mounted within and upon the side box frames 12 so as to extend upwardly to a height approximating the hoisting elevation of the machine. Thus, in the embodiment shown in FIGURES 1 to 8, the support columns 24 extend upwardly a relatively short distance, say 2 to 4 feet. However, as illustrated in the embodiment of FIGURES 11 and 12, the support columns 24 can be constructed to any desired height as necessary in a particular loading operation, ranging for example, up to 10 to 12 feet in height.

The upstanding support columns 24 provide suitable means for mounting suspended screw hoist mechanisms including elongated rotary screws 26. In the illustrated embodiment, the screws 26 are suspended from the columns by means of cap or support plates 28 and thrust bearings 30. As will appear, the thrust bearings 30 provide a freely suspended mounting of the screws 26 so that the load is transmitted to the screws in tension rather than in compression, as in conventional screw hoists.

As best illustrated in FIGURES 9 and 10, the screws 26 cooperate upon rotation with follower thrust bearings 32, which carry channel supports or like means 34 connecting the follower thrust bearings to the cargo elevator. In the illustrated embodiment, the channel support members 34 are guided in their movements along the vertical screws 26 by roller guides 36 which roll in substantially frictionless fashion along the insides of the support columns 24. In this regard both the support thrust bearing 30 and follower thrust bearing 32 are preferably of the type employing ball thrust bearings 38 between adapter or thrust plates 40. This construction permits some give between the screws 26 and thrust bearings 30 and 32, to accommodate slight warping movements of the cargo elevator platform, as hereinafter described.

Referring specifically to FIGURE 10, it will be seen that the follower thrust bearing is integral with and supported upon a follower nut 42, which may be of the Saginaw type. As is well known, Saginaw nuts conventionally employ ball or roller connections with the screw to reduce the friction, and to insure effective operation under conditions of substantial loading. In the illustrated embodiment, the ball nut 42 functions on rotation of the screws 26 to raise or lower the thrust bearing 32 and support channel 34, depending upon the direction of rotation of the screw.

The drive for the upstanding hoist mechanism 16 is shown in FIGURES 2 and 4. In general, the hoist mechanisms are driven by the motor 18 through individual worm gears 44 operatively connected to each of the screws 26. The worm gears 44 are connected to one another within the drive train 20 by means of universal connections 46 and power transmitting rods 48 and 50, the latter operating through gear boxes 52 to transmit drive torques through the end frame 14 from one side of the machine to the other. As will be understood, the motor 18 operates through the power transmitting rods and universal connections to rapidly rotate the worm gears 44, and thereby the screws 26 of the hoist mechanisms 16.

The motor is reversible and can be used in conjunction with various push button controls to provide a desired operation of the drive train to either raise or lower the cargo platform. As will hereinafter be explained in detail, suitable brake and clutch mechanisms (indicated at 54, 55 and 56, 58) can also be inserted in the drive train to permit operation of the screw hoists on one side of the machine independently of those on the opposite side of the machine, to permit a tilting of the cargo elevator with respect to the horizontal. In addition, such mechanisms can be operated to warp one end of the cargo elevator with respect to the other for purposes of effecting a desired alignment of the cargo elevator with respect to separate transport vehicles (e.g., plane and truck).

THE CARGO ELEVATOR

The cargo elevator, represented generally at 60 (FIGURES 1 and 2), is suspended on the screw hoists 16 so as to be vertically movable with respect to the base frame 10 and upstanding support columns 24. As illustrated, the cargo elevator comprises a substantially planar platform 62 having side rails 64 which define a general path of movement of cargo across the platform and between the upstanding hoist mechanisms 16.

As noted previously, the cargo elevator 60 is mounted on the follower thrust bearings 32 of the screw hoists by means of the channel supports 34. Preferably a pivotal connection is provided between the channel supports and the cargo elevator, as at 66 in FIGURE 9, to accommodate the slight tilting or warping movements in the cargo elevator described above.

In preferred embodiments, the cargo elevator is provided with conveyor means in the form of roller conveyors which serve to move cargo on and off, and across the elevator platform, in the desired direction. In the apparatus shown in FIGURES 1, 2, and 5, a substantial number of the roller conveyor units 68 can function as idlers to permit free passage of cargo across the elevator. However, driven rolls 70 positioned at spaced positions across the elevator effect a driving engagement with containers, pallets and other units of cargo being loaded or unloaded by the machine. Power for the driven rollers 70 can be provided by a suitable electric motor 74 which preferably is mounted on one of the side rails 64, for example by a platform 76. The motor 74 can operate through a suitable power takeoff, indicated at 78, which can be linked to the spindles of the driven rollers 70 by a conventional chain and sprocket assembly, indicated generally at 80 in FIGURE 5. This assembly includes the endless drive chain 82 which is reeved around the sprockets 84 and 86 in such fashion that the sprockets 88 for the driven rolls 70 are all rotated in the same direction. Chain tightening cranks 90 (pivoted at 72) may additionally carry sprockets 84 which are held in engagement with the chain by the tensioning means 94, regardless of the direction of movements of the drive chain 82. In this regard, the motor 74 is provided with suitable reversing controls to permit the chain to be driven in one direction or the other, to thereby move cargo in either direction across the cargo elevator 60.

In a typical use of the cargo elevator, cargo would move onto a forward portion of the cargo elevator as represented by forward or left hand portions of FIGURES 1 and 2. This movement is facilitated by idler rolls 98 and 100, respectively, on the forward end of the base frame 10 and cargo elevator 60. Once onto the cargo elevator, the motor 74 can be energized to rotate the drive rolls in a clockwise direction, in FIGURES 1 and 2, to move the cargo across the platform 62 to the rear of the elevator. Suitable cargo stops are preferably provided at the front and rear of the elevator to prevent undesired movement of the cargo during loading operations. As illustrated in FIGURE 6, one set of stops 102 can be mounted adjacent the rear of the base frame 10, for example, on pivots 104. These stops, in a typical loading operation would be in the down or full line position shown in FIGURE 6, in which position they would function to arrest the forward movement of the entering cargo. However, in those cases where it might be desirable to move cargo through the machine without any hoisting operation, the stops 102 can be pivoted out of the way, as in the dotted lines position of FIGURE 6. In conventional hoisting operations, as in FIGURES 6 or 8, an additional set of stops 106 provided on the front of the elevator move automatically into similar cargo holding position. As shown in FIGURE 8, the stops 106 are normally biased into the up or cargo holding position by torsion springs 107 carried on the pivot mounts 108 for the stops 106. This construction causes the stops 106 to remain in the holding position during all hoisting operations of the elevator but permits a rear extension 110 on the stops to engage the ground (on movement of the elevator to the down position) and lower the stops to the retracted position shown in FIGURE 1.

The hoist and conveyor mechanism of the illustrated cargo handling apparatus are preferably operated by means of electrically driven components. Electrical systems provide an advantage as to operating speeds and convenience of control which make them highly satisfactory for use in the machines of the present invention. Moreover, as illustrated in FIGURES 1 and 4, the electrical components (motors, electrical panels, controls, etc.) can be conveniently mounted on or within the frame and elevator components of the machine. Thus, the motor 18 for the hoist mechanism can be advantageously located in one of the side frames 12, as shown in FIGURE 4. In like fashion, a suitable electrical control panel (represented generally at 110 in FIGURE 1) may be supported adjacent one of the hoist columns 24. Electrical connections to the motor 74 driving the elevator conveyor units may likewise be conveniently mounted in retractable fashion within a side frame 12, so as to facilitate the vertical movements of the cargo elevator. In preferred embodiments, a portable hand control unit (shown at 112 in FIGURE 1) is associated with the panel 110 to facilitate control of the machine by a roving operator. As will be understood, such portable control can include reversing buttons for up and down movements of the hoist motor 18 and for forward and reverse movements of the conveyor motor 74, and to start and stop the operations of each of these motors.

OPERATION

The general embodiment of the machine illustrated in FIGURES 1 to 12 is suitable for use as a fixed loader at various cargo handling locations, for example, in terminals or warehouses, or in assigned truck or aircraft loading stations. For example, in the schematic representation of FIGURE 11, the apparatus is shown in a typical loading operation in which relatively large containers or pallet loads 120 are being fed into the cargo opening 122 of an aircraft 124. The initial movements of the cargo units 120 into position adjacent the machine (arrow 126) can be accomplished by any of the means conventionally used for this purpose in airport facilities (e.g., endless conveyors, forklift trucks, cargo transporters, etc.). As noted previously, the base support 10 of the cargo handling apparatus permits the units of cargo to be loaded into the apparatus at a relatively low level, as indicated by the arrow 128. In carrying out this operation, the portable control unit 112 can be used to energize the motor 74 and drive rollers 70 on the elevator to move the cargo onto the elevator platform. Movements of cargo onto the elevator is guided by the side rails 64, and by the stops 102 at the end of the base platform which prevent forward movements of the cargo which might damage the aircraft. Once the cargo is positioned for hoisting, the control 112 is used to energize the motor 18 for the hoist mechanisms 16 which raise the elevator to the loading position shown. During this hoisting operation, the upward movement of the cargo elevator releases the spring biased stops 106 to hold the cargo on the platform (see FIGURE 8). In the raised position, the conveyor motor 74 is energized to move the cargo through the opening 122 and into the aircraft. As will be apparent, the foregoing loading operations can be repeated as desired until the cargo capacity of the aircraft has been fully utilized. The foregoing operations can also be repeated, in a reverse operation, to unload the airplane.

In many instances the operator will find that the cargo opening 122 is at a slightly different angle than the platform of the cargo elevator 60. With the hoist mechanisms of the present invention, the operator can easily adjust the angle of the cargo elevator so that it aligns with the cargo opening. For example, assuming that the tail of the aircraft is up and that the rear of the cargo opening is slightly higher than the front, the hoist mechanisms 16 can be operated to raise the platform 62 until its left or forward edge is level with the left or forward lower edge of the cargo opening 122 (see FIGURE 11). At this point the hoist mechanisms on the forward (left hand) side of the machine can be disengaged by means of the brake and clutch assembly 56, 58. The hoist mechanisms on the rear (right hand) side of the machine can now be operated independently to raise the rear edge of the cargo elevator platform until the platform is level with the bottom of the cargo opening 122. The effect of the described operation is to cause a slight tilting of the cargo elevator so that the platform 62 is inclined in a slightly forward direction. This slight tilting is accommodated in the screw hoist mechanisms 16 of the present invention by a degree of flexibility in the screws themselves and by relative movement between the ball thrust bearings 38 and the adapter or thrust plates 40 (see (FIGURE 10).

In some instances, for example, when loading between a truck and the cargo opening of a larger transport vehicle at substantially the same level, it is desirable to adjust the height of a single corner of the elevator platform with respect to the plane of the entire platform. Thus, assuming the aircraft loading situation just described, it might be desirable to tilt the platform 62 to facilitate loading of the adjacent aircraft, whereas a horizontal plane might be desirable to insure proper alignment with the bed of a truck or other loading vehicle. This can be accomplished with the apparatus of the present invention by first tilting the loading platform in the manner above described, and thereafter using the brake and clutch assembly 54, 55 to disengage all but the hoist mechanism 16 adjacent the motor 18. The hoist motor can now be operated to lower the corner of the platform adjacent the motor 18, to bring the rear edge of the cargo elevator back to the horizontal plane. This "warping" movement is again made possible by the inherent flexibility built into the screw hoist mechanisms 16, including the screws 26 and thrust bearings 30 and 32.

MOBILE UNITS

Figure 13:
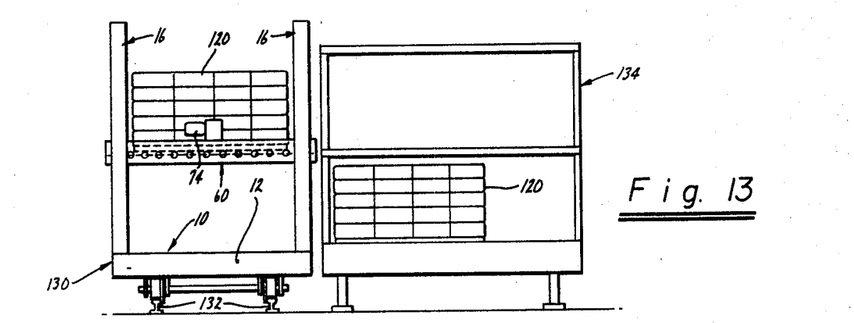
FIGURE 13 is a view in side elevation illustrating the use and operation of a further embodiment of cargo handling apparatus in accordance with the invention.
Figure 14:
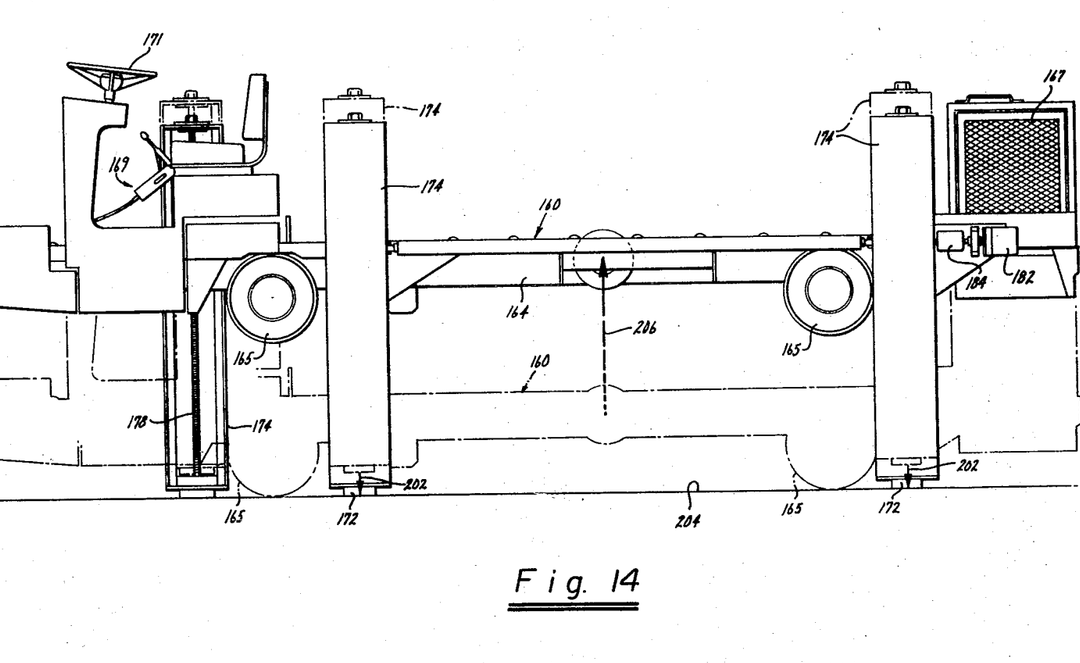
FIGURE 14 is a view in side elevation of a still further embodiment of cargo handling apparatus in accordance with the invention.
Figure 15:
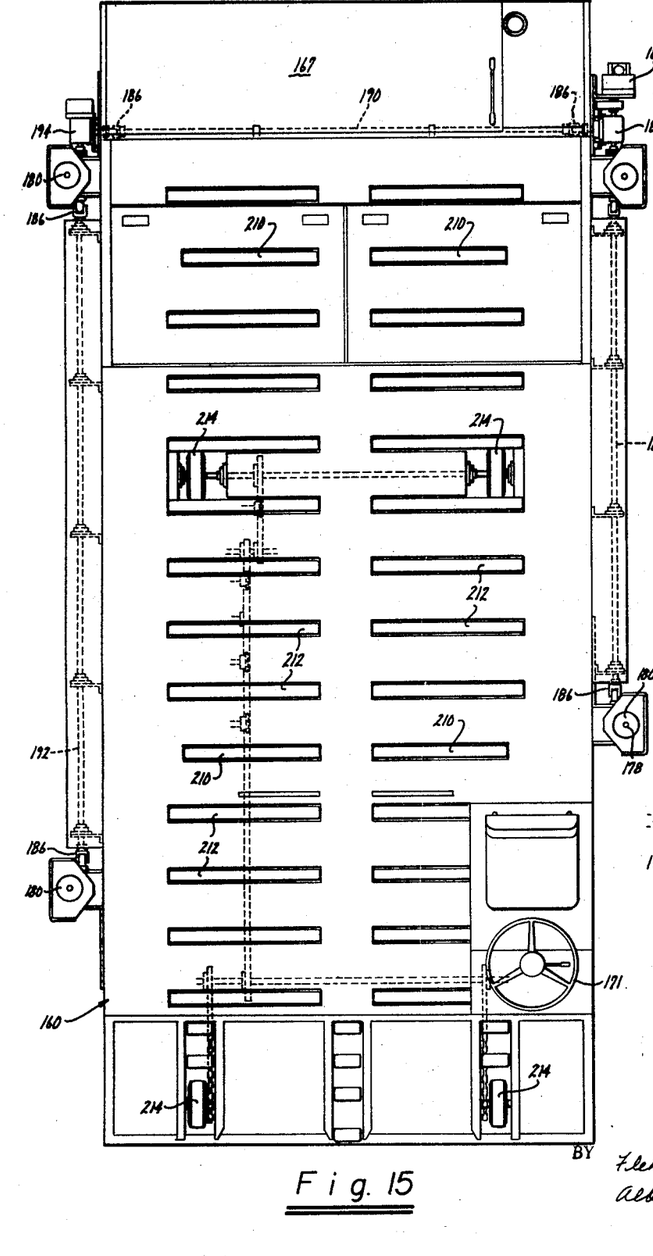
FIGURE 15 is an enlarged view in plan of the embodiment shown in FIGURE 14.
Figure 16:
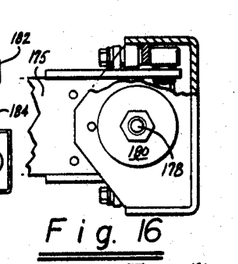
FIGURE 16 is an enlarged detail view in plan, illustrating a portion of the screw hoist mechanism as used in the embodiments of FIGURES 14 and 15.

While the embodiments of the invention so far described can be readily moved from one loading position to another, they are primarily designed for use as fixed loaders (e.g., see FIGURES 11 and 12). However, by simple modification, such apparatus can be easily adapted to use as mobile units. By way of illustration, the cargo handling units shown in FIGURE 12 might be mounted on various types of wheeled vehicles for use in warehouse pallet stacking operations, or similar operations. Thus, as shown in FIGURE 13, the base support 10 of such a unit might be suitably mounted on the platform of a truck or rail car 130. The latter could be pulled or otherwise conveyed on tracks 132 between various loading and unloading stations, as represented at 134.

SELF-PROPELLED UNIT

FIGURES 14 to 19 illustrate apparatus in which the cargo handling elevator, indicated generally at 160, is itself capable of functioning as a self-propelled vehicle. For this purpose, the frame 164 of the cargo elevator is constructed as a chassis for a self-propelled unit having wheels 165, a motor 167, and drive and steering means 169 and 171.

In the embodiment of FIGURES 14 to 19, support during the hoisting operation is provided by a plurality of ground engaging members or feet 172 on the separate hoist columns 174. The hoist columns are movable relative to the cargo elevator 160 which is rigidly secured to the frame or chassis 164 of the cargo elevator by means of transverse beams or cross supports 175. Follower thrust bearing units are rigidly secured to the bottom of the cross supports 175, as illustrated in 176 in FIGURES 17–19.

More particularly, referring to FIGURE 18, the follower thrust bearing unit 176 there shown includes a housing 177 which is secured by means of the fasteners 179 to the cross support 175. With the housing 177 a follower nut 181 of the Saginaw type, previously described, is mounted upon the elongate screw member 178. The upper portion of the follower nut 181 is nonrotatably secured to a collar 183 threadably received in the top plate of the housing 177.

Rotation of the hoist screw 178 is effected by a drive gear arrangement including a worm 185 fixedly secured to the power transmitting rod or shaft 188, the worm 185 being in driving engagement with a worm gear 187 secured to a vertical shaft 189 rotatably supported at its ends in a pair of anti-friction bearings 191 arranged within the housing 177.

The shaft 189 carries a drive gear 193 having teeth with a pitch profile complementary to that of the hoist screw 178 and similar to the profile developed by the follower nut 181. The drive gear 193 upon rotation of the shaft 189 effects rotation of the hoist screw 178 to vertically move the cargo platform through cooperation with the follower nut 181. It will be appreciated that the drive gear including the transmission shaft 188 is carried by the cargo platform or elevator 164, which moves with the follower nut.

ALTERNATE HOIST MECHANISM

Another form of screw hoist mechanism, useful in all embodiments of the invention, is shown in FIGURE 19. In this form of the invention, the screws 178 remain in tension but are mounted to be stationary rather than rotary, as in the previous embodiments. Thus, as shown in FIGURE 19, the hoist screws 178 are provided with fixed bearings 190 and 191 at top and bottom, respectively, for alignment purposes, the latter being constructed to accommodate vertical elongations of the screws 178.

In the embodiment of FIGURE 19, hoisting operations are accomplished by rotation of a driven follower nut 194. More specifically, the follower nut 194 is of the Saginaw type, previously described, and is rotatably mounted within a follower thrust bearing or housing unit 195, preferably made in two pieces for ease of manufacture and assembly. The lower portion of the housing 195 is recessed for retention of an upper anti-friction bearing 199 which in turn is fixedly secured to a worm gear 201 in driving engagement with a worm 203 keyed to the drive shaft 188. The follower nut 194 rotates in unison with the worm gear 201 being secured thereto by means of the threaded collar 205.

In operations of the alternate hoist mechanism shown in FIGURE 19, rotation of the power transmission shaft 188 revolves the worm gear 201 to rotate the follower nut 194 about the hoist screw 178. As will be understood, rotation of the nut 194 advances the cargo platform vertically with respect to suspended screws 178, which in this embodiment remain stationary except for slight twisting rotations permitted by support and alignment bearings 190 and 191 at the ends of the screws 178.

Although specifically illustrated in conjunction with the self-propelled unit of FIGURES 14 to 17, the screw hoist mechanism of FIGURE 19 can be effectively used in all embodiments of the invention shown herein, for example, as in FIGURES 1 to 12 and 13. The only difference is that the follower nut 194 comprises the driven element of the screw hoist mechanism rather than the tensioned screw components 178.

OPERATION OF THE SELF-PROPELLED UNITS

Rotation of the screws 178 or the follower nuts 181 or 194, as the case may be, to effect operation of the hoist mechanisms is accomplished by operation of the reversible hoist motor 182, which functions in the manner previously described through a drive train including the power transmission and auxiliary units 184, universal connections 186, and power transmitting rods 188, 190 and 192.

As will be apparent from the foregoing description, the hoist columns 174 have the capacity for relative movement with respect to the cargo elevator 160. To insure proper guiding and parallelism in all such movements, the hoist column may be suitably provided with internal guide means or rails 196 which cooperate with cam rollers 198 carried by vertically extending plate means 200 mounted on the cargo elevator frame 164. This construction, as represented in FIGURE 17, permits the hoist column 174 to move freely in a vertical direction with respect to the chassis 164 of the cargo elevator.

In hoisting operations with the mobile unit of FIGURES 14 to 19, the motor 182 is energized to first move the screws 178 in a downward direction as respects the cargo elevator platform 170 and cross supports 175. This movement, represented by the arrows 202, brings the feet 172 of the hoist columns into contact with the ground, represented at 204. Thereafter, continued operation of the hoists will cause the follower units 176 to travel up the screws 178 which, at this point, are suspended from the hoist columns on the thrust bearings 180. The net effect is a hoisting operation wherein the mobile cargo elevator unit 160 moves upward on the spaced apart hoist columns 174, as generally represented by the arrow 206. In reverse, operation of the hoist mechanisms first lowers the cargo elevator unit 160 to a position where its wheels 164 engage the ground (dotted line position in FIGURE 14) following which the hoist columns are elevated slightly to a retracted position (also represented by the dotted positions shown in FIGURE 14). With the hoist columns retracted in this manner, the propulsion unit 167 can be operated to propel the machine to any desired location.

Apart from the self-propelled nature of the cargo elevator 160, and the retractable nature of the hoist column 174, the mobile unit of FIGURES 14 to 19 can in all other respects be similar to the embodiments previously described. Thus the platform 162 of the cargo elevator 160 may be suitably provided with conveying rollers 210 and idlers 212, to facilitate loading and unloading of the cargo elevator. In this regard, additional conveying units in the form of small rubber-tired wheels 214 may also be provided to assist in initial loading and final unloading operations.

While the description has related to various embodiments and uses of the cargo handling apparatus according to the present invention, it is to be understood that many changes in construction and widely differing embodiments and applications of the invention will suggest themselves to those skilled in the art to which this invention pertains. The disclosures and description herein are therefore purely illustrative and are not intended to be in any sense limiting, except as in the appended claims.

We claim:

1. In compact cargo handling apparatus adapted to be used with aircraft, base support means including means for providing general mobility to the cargo handling apparatus, a plurality of upstanding support means mounted on said base support means, said upstanding support means being secured to said base support means so that they are self-supporting and their upper ends are free, screw hoist means including a screw suspended from its upper end from each upstanding support means, said upper end suspension of the screw being the only support thereof whereby the screw hoist means are at all times in tension, cargo platform means operatively connected to said screw hoist means so as to be suspended from and vertically movable with respect to said screw hoist means to raise and lower said platform means between desired loading and unloading positions, and conveyor means carried by said platform to move cargo across said platform at said loading and unloading positions.

2. Apparatus as in claim 1 wherein said upstanding support means comprise spaced apart columnar members, each provided with an individually suspended screw hoist means.

3. Cargo handling apparatus as in claim 2 wherein said columnar members are adapted to selectively engage the ground, and thereby to support said cargo handling apparatus during loading and unloading operations.

4. Apparatus as in claim 1 wherein each of said screw hoist means includes a vertically elongated screw suspended from a support thrust bearing mounted on an upstanding support means and a follower thrust bearing mounted on said cargo platform means, said thrust bearings transmitting the load so that the screws are in tension.

5. Apparatus as in claim 1 wherein said screw hoist means includes a drive means, and means operatively connecting said drive means to said screws.

6. Cargo handling apparatus as in claim 5 wherein said screws are rotatably mounted in said thrust bearings and said drive means operates to rotate said screws to vertically move said cargo platform means with respect to said support means.

7. Cargo handling apparatus as in claim 5 wherein said screws are nonrotatably suspended from said support thrust bearings, and said drive means operates to rotate said follower thrust bearings to vertically move said cargo platform means with respect to said support means.

8. The cargo handling apparatus as in claim 5 wherein said drive means are carried by said cargo platform means.

9. Cargo handling apparatus as in claim 1 wherein said cargo platform means is a wheeled self-propelled unit and said upstanding support means and cargo platform means are movably connected to one another in such fashion that the entire cargo handling apparatus can be selectively supported on said wheeled cargo platform during mobile movements of the latter.

10. In cargo handling apparatus adapted to use with aircraft, base support means adapted for use in a fixed position, said base support means being provided with a plurality of upstanding support means, each of said upstanding support means carrying a suspended screw hoist mechanism, substantially planar cargo platform means adapted to vertical movements with respect to said upstanding support means, means independently connecting said cargo platform to each of said suspended screw hoist mechanisms whereby said cargo platform is suspended from said upstanding support means by said screw hoist mechanisms, drive means for said screw hoist mechanisms whereby said platform can be raised or lowered between desired loading and unloading positions, said drive means including a power source and a drive train connecting each of said screw hoist mechanisms to said power source, and clutch means in said drive train to facilitate disconnecting at least one of said screw hoist mechanisms, whereby remaining screw hoist mechanisms can be driven independently of said disconnected screw hoist mechanism to permit warping of a side edge of said substantially planar cargo platform means to facilitate alignment of said edge with the mating edge of a transport surface.

11. In cargo handling apparatus, base support means, a plurality of upstanding support means mounted on said base support means at horizontally spaced positions, at least two of said upstanding support means being aligned with one another in a first vertical plane, the remaining of said upstanding support means being aligned with one another in a second vertical plane parallel to said first vertical plane, each of said upstanding support means being provided with thrust bearing means adjacent an upper portion thereof, screw hoist means suspended from each of said thrust bearing means, follower thrust bearing means mounted on each of said screw hoist means for vertical movements thereon, substantially planar cargo platform means connected to each of said follower thrust bearing means so as to be suspended from and vertically movable on said screw hoist means, and means driving said screw hoist means to cause said follower thrust bearing means to raise and lower said cargo platform means between desired loading and unloading positions with respect to said base support means, said means driving said screw hoist means including a power source adapted to reversible operation, a drive train connecting said power source to each of said screw hoist means to effect rotation thereof, and clutch means positioned in said drive chain between said first and second parallel vertical planes to effect selective disengagement of one or more of said screw hoist means, whereby the screw hoist means carried by the upstanding support members in one of said planes can be operated independently of the screw hoist means carried by the upstanding support members in the other of said planes to effect a tilting of said cargo platform means with respect to the horizontal.

12. Cargo handling apparatus as in claim 11 wherein said clutch means is positioned between the uptsanding support members in one of said parallel vertical planes whereby at least one of said screw hoist means carried by said upstanding support members can be disengaged to thereby effect warping of a corner portion of said substantially planar cargo platform means with respect to the plane of said cargo platform means.

References Cited

UNITED STATES PATENTS

| 1,522,967 | 1/1925 | Meyer et al. | 187—24 |
| 1,996,618 | 4/1935 | Huber | 187—24 |
| 2,262,833 | 11/1941 | Clawson et al. | 187—8.59 |
| 3,035,717 | 5/1962 | Stone | 187—24 X |
| 3,190,464 | 6/1965 | Johansen et al. | 187—8.59 X |
| 3,215,227 | 11/1965 | MacChesney | 187—24 |
| 3,370,727 | 2/1968 | Shaw | 214—512 |

ALBERT J. MAKAY, Primary Examiner

U.S. Cl. X.R.

187—25; 214—518; 254—92